United States Patent [19]

Axmann

[11] Patent Number: 5,083,411
[45] Date of Patent: Jan. 28, 1992

[54] APPARATUS FOR UNSTACKING, FILLING AND STACKING CONTAINERS WHICH ARE THE SAME AS EACH OTHER

[75] Inventor: Norbert Axmann, Sinsheim-Ho, Fed. Rep. of Germany

[73] Assignee: Firma Axmann-Fördertechnik GmbH, Sinsheim-Steinsfurt, Fed. Rep. of Germany

[21] Appl. No.: 577,776

[22] Filed: Sep. 5, 1990

[30] Foreign Application Priority Data

Sep. 6, 1989 [DE] Fed. Rep. of Germany ....... 3929568

[51] Int. Cl.$^5$ .............................................. B65B 43/48
[52] U.S. Cl. ........................................ 53/252; 53/251; 414/788.7
[58] Field of Search ................. 53/250, 251, 252, 249, 53/473, 525, 541; 141/168, 176; 414/788.7, 795.3, 797.4

[56] References Cited

U.S. PATENT DOCUMENTS

| 2,744,372 | 5/1956 | Cleaveland et al. | 414/788.7 X |
| 2,907,158 | 10/1959 | Lambrozzi et al. | 53/525 |
| 2,940,327 | 6/1960 | Gartner | 414/795.3 X |
| 3,421,638 | 1/1969 | Locke et al. | 414/788.7 |
| 3,633,732 | 1/1972 | Russell et al. | 53/525 X |
| 3,895,477 | 7/1975 | Yamashita | 53/252 X |
| 4,687,403 | 8/1987 | Motoda | 414/788.7 X |

FOREIGN PATENT DOCUMENTS

| 63-202521 | 8/1988 | Japan | 414/795.3 |
| 63-208432 | 8/1988 | Japan | 414/788.7 |

Primary Examiner—Robert L. Spruill
Assistant Examiner—Daniel B. Moon
Attorney, Agent, or Firm—Max Fogiel

[57] ABSTRACT

A stacking station for receiving empty containers stacked in superposed relationship and a stacking station for receiving full containers which are also stacked in superposed relationship are disposed side-by-side while arranged at a right angle relative thereto and adjacent the empty container stacking station is a station for filling the containers. When viewed from above the apparatus forms an angle with the empty container stacking station as the angle corner. In normal use that permits the apparatus to be used in a space-saving fashion in such a way that the two stacking stations can be set up at the end of a production machine from which articles are to be taken while the filling station extends on the discharge side of a machine of that kind for component ejection.

8 Claims, 3 Drawing Sheets

APPARATUS FOR UNSTACKING, FILLING AND STACKING CONTAINERS WHICH ARE THE SAME AS EACH OTHER

BACKGROUND OF THE INVENTION

The invention relates to an apparatus for unstacking, filling and stacking containers which are the same as each other, comprising a stacking station for receiving empty containers which are stacked in superposed relationship, a station for filling a respective container with articles which are supplied in succession or in batches, and a stacking station for receiving filled containers in superposed stacked relationship, comprising support means which are adapted to be actuated between positions for receiving the respective lowermost container of a stack and releasing same, and a lift means for lowering and raising the respective lowermost container of a stack from or into the stacking positions defined by the support means, and further comprising conveyor means for transferring a respective unstacked container from the empty container stacking station into the filling station and, after filling of said container, from the filling station into the other stacking station.

Apparatuses of that kind which are frequently referred to as container filling stations are already state of the art. Those apparatuses have an empty container stack in which the respective lowermost container can be moved into a filling station which is disposed beside the empty container stack and can there be filled with parts which are supplied for example by means of a conveyor belt, which however is of no further interest here. After the filling operation the container is conveyed along into a stacking station which is arranged beside the filling station and is there stacked with other filled containers in superposed relationship in a stack position which is elevated with respect to the conveyor path.

In that arrangement, transportation of the containers from the empty stack by way of the filling station to the full container stack is effected by means of a roller conveyor which so-to-speak forms the bottom or floor of the assembly. Furthermore the arrangement includes lift means for lifting containers into the elevated stacking position or lowering the respective lowermost container from the elevated stacking position onto the roller conveyor. In that way the lowermost container is conveyed away laterally out of the empty container stack into the filling station and a filled container is conveyed along to the full container station in which a filled container is then stacked in the elevated position by a lifting operation until support means come into operation.

Such apparatuses are widely used in plastic material-processing works in order to pick up the components coming from molds of production machines such as plastic material injection molding machines. In such works the production machines are generally disposed in side-by-side relationship in a row so that there is comparatively little space between the individual machines. For that reason container filling and stacking apparatuses generally cannot be set up between the individual machines but only at the ends thereof, in the passageways between adjacent rows of machines. It will be appreciated that even in that situation the previously known apparatuses in which the two stacking stations with a filling station disposed therebetween are arranged in a row take up so much space that problems in setting out the apparatuses occur at any event when operation is effected simultaneously at a plurality of adjacent machines and accordingly such an apparatus must be associated with each of the adjacent machines.

SUMMARY OF THE INVENTION

The underlying object of the present invention is that of so improving an apparatus of the kind and for the purpose set forth in the opening part of this specification, that it can be used without causing problems even in tight spaces.

In accordance with the invention that object is achieved by arranging the stacking station for stacking full containers and the filling station at an angle relative to each other and each immediately beside the empty container stacking station, and that the conveyor means for transferring the containers from the filling station into the full container stacking station form a conveyor path which passes through the empty container stacking station and beneath the empty container stack and which extends at an angle.

Although any desired angular configurations can be envisaged and can also be achieved without involving problems, the filling station and the full container stacking station desirably form a right angle with the empty container stacking station as an angle corner.

In consideration of the arrangement according to the invention of the stacking stations for the empty and full containers in directly juxtaposed relationship and the filling station at an angle thereto directly beside the empty container stacking station which, as viewed from above, forms an angle corner, the apparatus according to the invention is of a comparatively short lengthwise extent in comparison with known apparatuses with stacking stations arranged in a row in juxtaposed relationship and a filling station accommodated between them.

Apparatuses designed in accordance with the invention may be set up at the end of production machines in a space-saving configuration in such a way that the respective filling station projects in between two adjacent machines while the full container stacking station is disposed at the end of the respective machine and the empty container stacking station forms an angle corner between the other two stations. In relation to the above-mentioned use of the apparatus according to the invention, small-size components which are ejected from a production machine individually or in batches are fed to a container disposed in the filling station of the apparatus, for example by means of a conveyor belt, although that is known and is of no further specific interest herein.

With the apparatus according to the invention, conveyance of a respective filled container from the filling station into the stacking station for filled containers is effected through the empty container stacking station which forms an angle corner between the full container stacking station and the filling station, more specifically beneath the empty containers which are stacked in superposed relationship and of which the respective lowermost container is accommodated by support means which can be actuated into a disengaged position.

In that connection, it has proven to be advantageous for the conveyor means for transferring the empty containers from the empty container stacking station into the filling station and, after the filling operation, back into the empty container stacking station and from same into the full container stacking station, to be a slider which is adapted to be reciprocated in the respective direction of conveying movement, and guide tracks, which receive the containers and permit conveyance thereof in conveyor paths which extend at an angle to each other. In that arrangement the reciprocatable sliders may be actuated by means of reversible operating cylinders.

In accordance with a development of the invention the slider which is adapted to be reciprocated between the empty container stacking station and the filling station may be a U-shaped receiving frame whose open side faces towards the full container stacking station, and the guide means involved in transfer of the filled containers from the empty container stacking station into the full container stacking station may desirably be slide plates which, when the receiving frame is in the empty container stacking station, adjoin the limbs thereof and extend into the full container stacking station.

In that development the lift means for unstacking and stacking the containers engage the container bottoms, by extending between the limbs of the U-shaped receiving frame and between the slide plates which extend into the full container stacking station.

The slider for transferring the full containers from the empty container stacking station into the full container stacking station may have an entrainment arm which engages the containers on the side remote from the full container stacking station and which, upon suitable actuation, transfers a filled container by way of the limbs of the U-shaped receiving frame and the adjoining slide plates into the full container stacking station where the stacking operation is then effected by means of the lift arrangement associated with that stacking station.

A development of the invention further provides that a container which is accommodated in the filling station is shaken during the filling operation by means of an operating cylinder or is adapted to be intermittently reciprocated in the direction of conveying movement relative to the empty container stacking station, thereby providing for substantially uniform filling of the container.

BRIEF DESCRIPTION OF THE DRAWINGS

An embodiment of the apparatus for unstacking, filling and stacking containers which are the same as each other will be described hereinafter with reference to the accompanying diagrammatic drawings in which.

DESCRIPTION OF THE PREFERRED EMBODIMENTS

Figure 2:
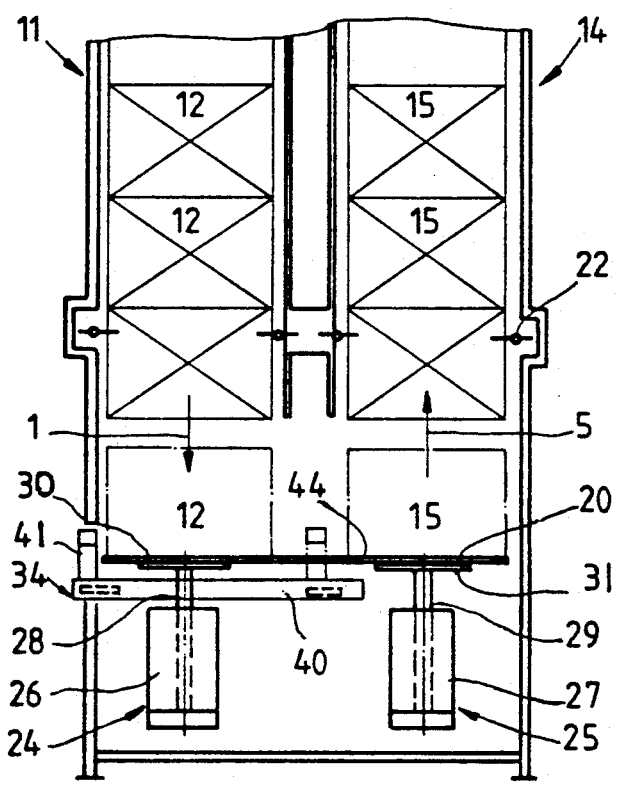
FIG. 2 is a view in section taken along line II—II in FIG. 1 through the two stacking stations.
Figure 3:
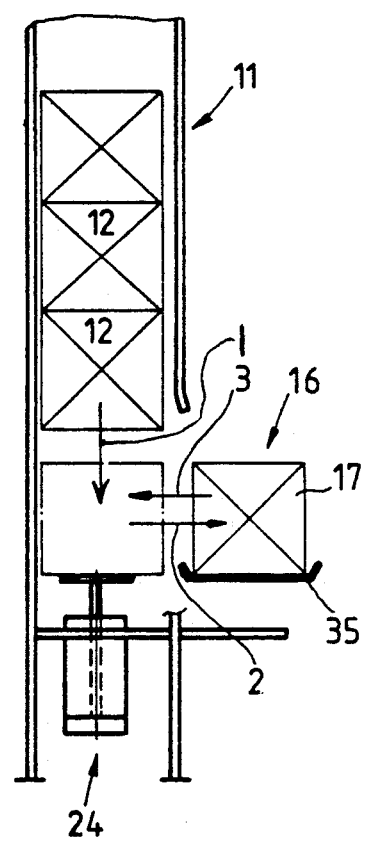
FIG. 3 is a side view of the FIG. 2 arrangement showing the empty container stacking station and the filling station.
Figure 1:
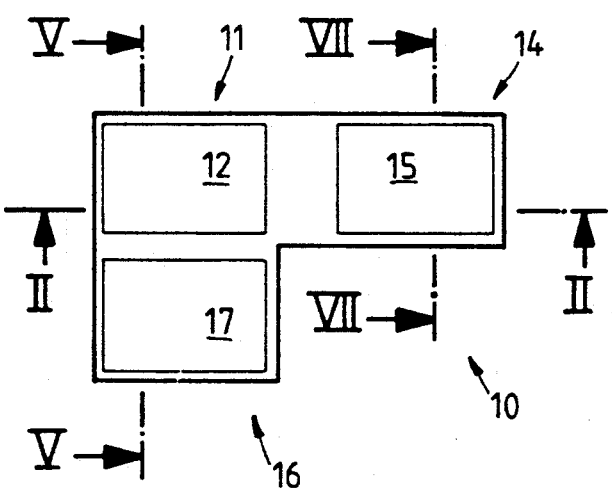
FIG. 1 is a plan view of the apparatus with a respective stacking station for empty and filled containers and a station for filling the containers.

In the apparatus 10 shown in FIGS. 1 to 3, a stacking station 11 for receiving empty containers 12 and a stacking station 14 for receiving filled containers 15 are arranged directly beside each other, together with a station 16 for filling a respective container identified at 17, with small components which are supplied in succession or also in a batch-wise manner, with the station 16 being disposed at a right angle to the two stacking stations 11 and 14 and directly beside the empty container stacking station 11. The sectional view in FIG. 2 through the two stacking stations 11 and 14 shows the stacking in superposed relationship of both the empty containers 12 and also the filled containers 15, in a position which is elevated in relation to a horizontal plane 20 of conveying movement by a distance which is greater than the vertical extent of the containers.

The containers which are disposed in superposed stacked relationship are retained by means of supports 22 which are only diagrammatically indicated in FIG. 2 and which can be actuated in a manner to be described hereinafter between their position of supporting the containers and a position of releasing the containers, with the supports 22 respectively engaging the lowermost container 12, 15 respectively of a stack thereof.

Each of the stacking stations 11 and 14 is provided with a lift device 24, 25 in order to lower the empty containers 12 in a vertical direction from the elevated stacked position into the plane 20 of conveying movement or to lift the filled containers 15 from the plane 20 into the elevated stack position. Each of the lift devices 24, 25 has an operating cylinder 26, 27 with a piston 28, 29 which can be extended in a vertical direction while a plate 30, 31 is disposed at the end of the respective piston remote from the operating cylinder 26, 27; when stacking or unstacking the containers, the plates 30, 31 engage beneath the bottoms of the containers.

In addition, provided in the basic frame structure of the apparatus are conveyor means 33, 34 for transferring empty containers into the filling station 16 on the one hand and out of the filling station into the full container stacking station 14 on the other hand. The conveyor means 33 for transferring containers from the stacking station 11 into the filling station 16 and after the filling operation out of the filling station 16 back into the empty container stacking station includes a U-shaped receiving frame 35 with its open side facing towards the full container stacking station 14; the frame 35 can be reciprocated by means of an operating cylinder 36 between a position at the empty container stacking station and the filling station, and it receives the containers to be transferred. The operating cylinder 36 is a pneumatic cylinder without piston rod, which has a piston extension portion 37 which sticks out laterally through the wall of the cylinder and which is connected to the receiving frame 35. The conveyor means 34 for transferring filled containers from the empty container stacking station 11 into the full container stacking station 14 include an extension portion 41 which can be actuated by means of a similar operating cylinder 40 and which extends through a longitudinal slot in the wall of the cylinder, together with a pusher or slider 42 which is connected to the extension portion 41, as well as slide plates, 44 which, when the receiving frame 35 is at the empty container stacking station, adjoin the open side thereof and which, engaging at both sides under the containers to be conveyed, extend into the full container stacking station.

In normal use of the apparatus, a plurality of empty containers 12 are accommodated in superposed stacked relationship in the empty container stacking station 11. By actuation of the lift device 24 associated with that stacking station, the lowermost container in the stack is lowered as indicated by the arrow 1 into the position shown in broken lines at 12 in the plane 20 of transportation movement, with simultaneous unlocking of the supports 22, and received on the U-shaped receiving frame 35. The supports 22 then engage the container 12 which is then the lowermost container in the stack, and support it, with the empty containers stacked thereabove, in the elevated stack position.

Figure 5:
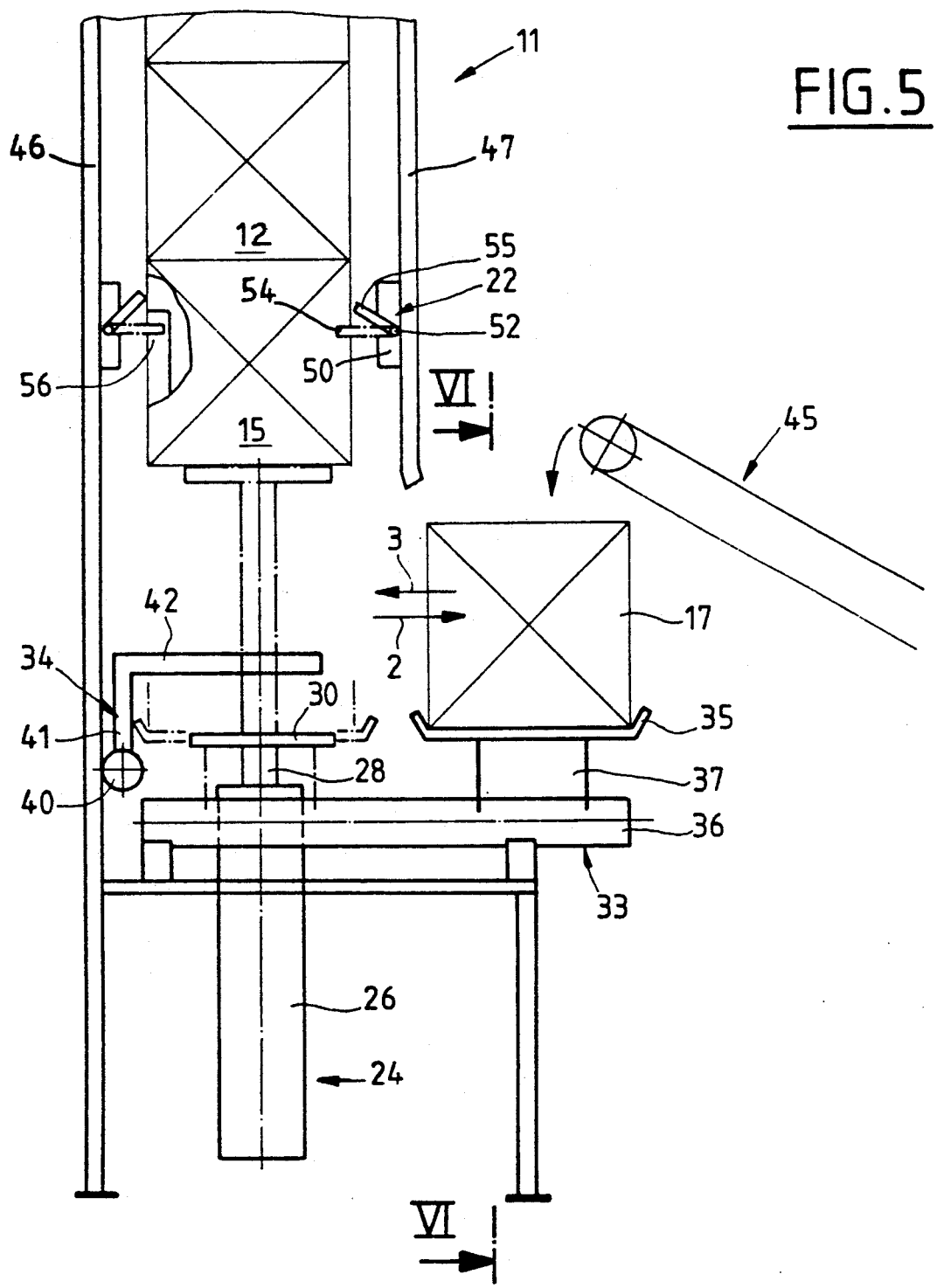
FIG. 5 is a sectional view on an enlarged scale corresponding to the sectional line indicated at V—V in FIG. 1, illustrating the empty container stack being received on the actuatable support means for engaging the lowermost container.
Figure 6:
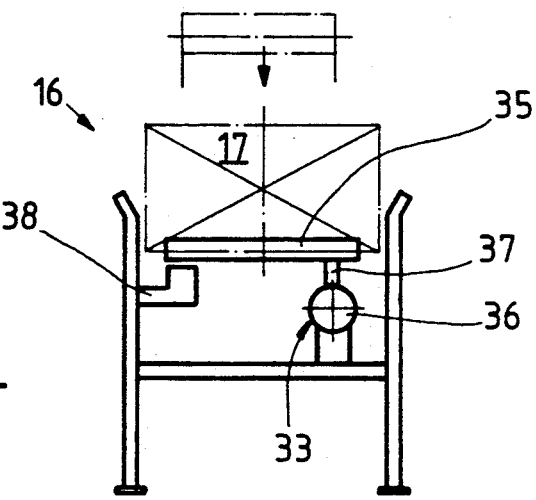
FIG. 6 is a view in cross-section taken along line VI—VI in FIG. 5 through the filling station.

By actuation of the conveyor arrangement 33 which is operative in the direction towards the filling station 16, the unstacked empty container accommodated on the frame 35 is then conveyed as indicated by the arrow 2 into the filling station 16. That is shown in FIGS. 3 and 5. After the operation of filling of the container in the filling station 16, for example by means of a conveyor belt 45 indicated in FIG. 5, the filled container is transported back into the empty container station 11, as indicated by the arrow 3, by means of the same conveyor arrangement 33. The filled container is then transported as indicated by the arrow 4 by means of the conveyor arrangement 34 into the full container stacking station 14 in order then to be lifted as indicated by the arrow 5 by actuation of the lift device 25 associated with that stacking station, and then stacked at an elevated stack position in which the supports 22 which are to be described in greater detail hereinafter possibly already support the filled container 15 above that stacked container.

Figure 7:
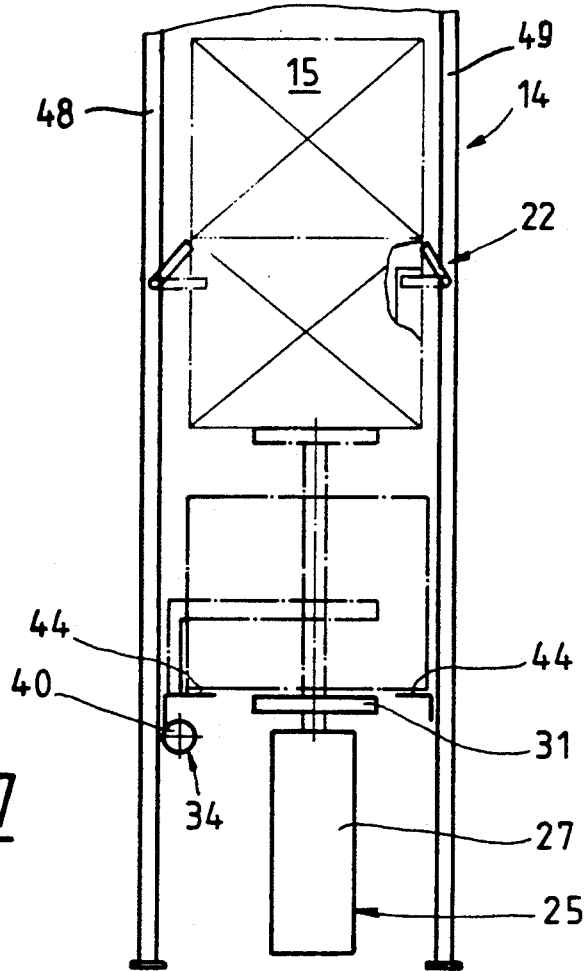
FIG. 7 is a view also on an enlarged scale and in cross-section taken along line VII—VII in FIG. 1 through the full container stacking station.

As shown in particular in FIGS. 5 and 7, in the operation of unstacking the empty containers and stacking the filled containers, the lift devices 24 and 25 engage the container bottoms by passing through between the limbs of the U-shaped receiving frame 35 and between the lateral slide plates, 44 which extend into the full container stacking station 14. Element 38 is a guide on which the edge of the receiving frame 35 can be guided to prevent tipping of the receiving frame.

Figure 4:
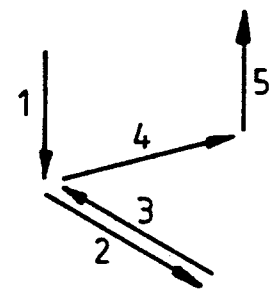
FIG. 4 is a conveyor diagram illustrating the conveyor paths of the containers from the empty container stacking station into the filling station and from the latter to the full container stacking station.

FIGS. 2 and 3 show that the containers 12, 15 which are carried on the above-mentioned supports 22 are held at a vertical spacing from the plane 20 of conveying movement of the apparatus, which is greater than the vertical extent of the containers. The individual sequences of movements when removing an empty container 12 from the empty container stack, transferring same into the filling station 16 and, after the filling operation, back into the empty container station, and from there into the full container station 14, as well as the subsequent stacking at an elevated position, are also indicated by the arrows 1 to 5 in the diagrammatic illustration of the conveyor paths involved, in FIG. 4.

FIGS. 5 and 7 show views on an enlarged scale in comparison with FIG. 2 of the configuration of the supports 22 for supporting empty containers 12 and full containers 15 respectively in the elevated stack positions in the stacking stations 11 and 14 respectively. The supports 22 comprise mounting blocks 50 which are mounted to vertical frame members 46, 47 and 48, 49 respectively which laterally delineate the stacking stations, and cantilever arms or brackets 54 which are pivotable in the mounting blocks 50 about horizontally extending pivot axes 52 between a horizontal position and an upwardly directed disengagement position and which in the stacking position engage in the manner shown in FIG. 5 into gripping openings or recesses 56 at the upper edge of the respective lowermost container 12 or 15 respectively in the stack.

If a container 12 is to be removed from the stack of containers shown in FIG. 5, the entire stack must be lifted for that purpose by means of the lift device 24 by such a distance that the pivotable cantilever arms or brackets 54 move into the positions indicated in solid lines at 55 in which they initially remain in the subsequent downward movement of the entire stack of containers, but after the lowermost container 12 in the stack has passed the supports 22 in the course of the downward movement of the stack, the cantilever arms or brackets 54 are released for re-engaging into the openings or recesses 56 in the next following container 12 in the stack. Besides illustrating the way in which the containers 12 are supported on the above-described supports, FIG. 5 also shows the lift device and in broken lines indicates the engagement thereof against the bottom of the container which is the lowermost container in the stack.

When stacking a full container in the full container stacking station, the container 15 is raised by means of the lift device 25 whose plate which engages under the bottom of the container to be stacked moves upwardly between the slide plates 44; with its upper edge, the container 15 encounters the edge region of the lowermost one of the containers which have already been stacked, whereupon, with further upward movement, the entire stack of containers is lifted and the cantilever arms or brackets 54 which hitherto were in the condition of engagement with the lowermost container, pivot upwardly into the positions shown in solid lines at 55. For stacking purposes each container must be raised by such a distance above the elevated stack position of the container which is the respective lowermost container in the stack, that the cantilever arms or brackets 54 which are pivotally mounted at the mounting blocks 50 can pivot into the openings or recesses 56 arranged in the vicinity of the upper edge of the container.

I claim:

1. An arrangement for unstacking, filling and stacking identical containers, comprising: a first stacking station for receiving empty containers stacked in superposed relationship; a filling station for filling containers with material supplied in succession or batches; a second stacking station for receiving filled containers and stacking the filled containers in superposed stacked relationship; support means actuatable between positions for receiving a lowermost container of a stack and releasing said lowermost container; lift means for lowering and raising said lowermost container of a stack from or into stacking positions defined by said support means; conveyor means for transferring an unstacked container from said first stacking station to said filling station, said conveyor means transferring thereafter said unstacked container after being filled from said filling station to said second stacking station; paths of containers entering said filling station and said second stacking station being arranged at an angle relative to each other so that said second stacking station and said filling station are closely adjacent to said first stacking station; said conveyor means forming a conveyor path extending at an angle and passing under an empty container stack; the path of containers entering said filling station forming substantially a right angle with the path of containers entering said second stacking station, said first stacking station being located at an intersection of the two paths.

2. An arrangement as defined in claim 1, wherein said conveyor means comprises sliders reciprocatable from one conveying direction to another; and guide tracks for supporting a container to be conveyed along said paths.

3. An arrangement as defined in claim 2, including reversible operating cylinders connected to said reciprocatable sliders.

4. An arrangement as defined in claim 2, wherein one of said sliders is reciprocatable between said first stacking station and said filling station and comprises a U-shaped receiving frame having an open side facing towards said second stacking station; and slide plates extending into said second stacking station and adjoining limbs of said receiving frame when said receiving frame is in said first stacking station.

5. An arrangement as defined in claim 4, wherein said lift means engage bottoms of containers between said limbs of said U-shaped receiving frame and between said slide plates.

6. An arrangement as defined in claim 2, wherein one of said sliders transfers containers to said second stacking station and has an entrainment arm engaging containers on a side remote from said second stacking station.

7. An arrangement as defined in claim 1, including an operating cylinder for shaking a container while being filled in said filling station.

8. An arrangement as defined in claim 1, wherein a container being filled in said filling station is intermittently reciprocated in a conveying direction relative to said first stacking station.

* * * * *